(12) United States Patent
Silveira et al.

(10) Patent No.: US 12,726,352 B2
(45) Date of Patent: Sep. 1, 2026

(54) METHODS FOR ACCELERATING PRIME NUMBER GENERATION IN ELECTRONIC DEVICES

(71) Applicant: SK Hynix NAND Product Solutions Corp., San Jose, CA (US)

(72) Inventors: Andre Silveira, Gold River, CA (US); Gamil Cain, El Dorado Hills, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 379 days.

(21) Appl. No.: 18/086,482

(22) Filed: Dec. 21, 2022

(65) Prior Publication Data

US 2024/0214200 A1 Jun. 27, 2024

(51) Int. Cl.
*H04L 9/30* (2006.01)
*H04L 9/08* (2006.01)

(52) U.S. Cl.
CPC .......... *H04L 9/3033* (2013.01); *H04L 9/0866* (2013.01); *H04L 9/0869* (2013.01)

(58) Field of Classification Search
CPC ... H04L 9/3033; H04L 9/0866; H04L 9/0869; H04L 9/3263; G06F 2207/7204
See application file for complete search history.

(56) References Cited

U.S. PATENT DOCUMENTS 7,016,494 B2 * 3/2006 Hopkins ............... H04L 9/3033 380/47
8,787,566 B2 * 7/2014 Relyea .................. H04L 9/0894 713/168
10,063,372 B1 * 8/2018 Chiu ..................... H04L 9/0894
2004/0260931 A1 * 12/2004 Fischer .................. G06F 17/10 713/176

(Continued)

FOREIGN PATENT DOCUMENTS

CN 107645375 A * 1/2018

OTHER PUBLICATIONS

Sky Hynix NAND Product Solutions Corp., International Search Report and Written Opinion—PCT/US2023/084657, Apr. 25, 2024, 11 pgs.

*Primary Examiner* — Philip J Chea
*Assistant Examiner* — Ghizlane Maazouz
(74) *Attorney, Agent, or Firm* — Morgan, Lewis & Bockius LLP

(57) ABSTRACT

This application is directed to prime number generation in an electronic device. The electronic device has a first executable and a second executable, and each executable has a unique identifier. The electronic device generates a wrapping key for the first executable and encrypts a prime number with the wrapping key of the first executable to generate an encrypted prime number. The encrypted prime number is stored locally in memory of the electronic device, and is only decryptable by the first executable but not by the (Continued)

second executable. In some embodiments, the first executable extracts the encrypted prime number from the memory of the electronic device, obtains the wrapping key of the first executable, and decrypts the encrypted prime number based on the wrapping key. In an example, the second executable is followed by the first executable, and generates the wrapping key based on a unique identifier of the second executable.

20 Claims, 14 Drawing Sheets

(56) References Cited

U.S. PATENT DOCUMENTS

| | | | | |
|---|---|---|---|---|
| 2005/0190912 | A1 * | 9/2005 | Hopkins | H04L 9/3033 380/44 |
| 2010/0325431 | A1 | 12/2010 | Mordetsky et al. | |
| 2013/0061058 | A1 | 3/2013 | Boivie et al. | |
| 2014/0223192 | A1 * | 8/2014 | Dent | G06F 21/52 713/189 |
| 2016/0043870 | A1 | 2/2016 | Avanzi | |
| 2020/0266999 | A1 | 8/2020 | Schwarz et al. | |
| 2021/0226783 | A1 * | 7/2021 | Levin | H04L 9/3033 |
| 2021/0328792 | A1 * | 10/2021 | Ramesh | H04L 9/0662 |
| 2021/0377010 | A1 | 12/2021 | Kong | |
| 2022/0085998 | A1 * | 3/2022 | Xiao | G06F 7/728 |
| 2022/0182878 | A1 * | 6/2022 | Xue | H04W 72/23 |
| 2022/0321339 | A1 * | 10/2022 | Yedluri | H04L 9/0894 |
| 2022/0405391 | A1 * | 12/2022 | Liu | G06F 21/44 |
| 2024/0072992 | A1 * | 2/2024 | Moon | H04L 9/008 |
| 2024/0078326 | A1 * | 3/2024 | Moran | G06F 21/53 |

* cited by examiner 800
502
502B
Executable 0
502A
Executable 1
208
Engine Component
606
UDS
504B
$CI_0$
$f_{OWF}()$
$CDI_D$
506-E
506-E
$CDI_D$
504A
$CI_1$
$f_{OWF}()$
506B
$CDI_0$
602B
Unique Identifier 0
$f_{WK}()$
402A
Wrapping Key 1
...
506B
$CDI_0$
$CI_2$ or FSD
$f_{OWF}()$
506A
$CDI_1$
602A
Unique Identifier 1
$f_{WK}()$
Wrapping Key 2
402A
$WK_1$
+
202A
PN
404A
Encrypted PN
...
...

METHODS FOR ACCELERATING PRIME NUMBER GENERATION IN ELECTRONIC DEVICES

TECHNICAL FIELD

This application relates generally to cryptographic technology including, but not limited to, methods, systems, and non-transitory computer-readable media for providing prime numbers that are used in secure operations.

BACKGROUND

Electronic devices can function and interact with each other in a secure manner based on different types of secure operations. Sensitive data are normally communicated among electronic devices in an encrypted format. Related electronic devices, software applications, or user accounts are authenticated before any sensitive data are communicated. Authentication and encryption algorithms have been developed to enhance different secure operations, and keys are generated based on prime numbers and applied in many of these authentication and encryption algorithms. The prime numbers applied in these secure operations have extended lengths (e.g., 2048 bits or more), and generation of the prime numbers can take an extended time and delay the secure operations and/or general operations, particularly in an embedded device that has limited computational resources. It would be beneficial to accelerate generation of prime numbers for the purposes of secure operations more efficiently in different electronic devices including embedded devices.

SUMMARY

Various embodiments of this application are directed to methods, systems, devices, non-transitory computer-readable media for providing prime numbers that are applied in different secure operations (e.g., attestation, authentication, certification, and encryption). Prime numbers do not need to be generated on demand during each secure operation. Rather, each prime number is prepared in advance and stored in an encrypted format for a respective executable of an electronic device. The executable then extracts and decrypts an encrypted prime number when needed to recover a corresponding prime number, which can be applied to create cryptographic keys for subsequent secure operations. For each executable, its corresponding prime number can only be decrypted by the respective executable, but not by any other executable. By these means, each prime number does not need to be generated on demand and can be used in the respective executable (not in any other executable distinct from the respective executable) without compromising a security level of the prime number.

In one aspect, a method is implemented to provide a prime number at an electronic device having a first executable and a second executable. Each executable has a unique identifier within the electronic device. The method includes generating a wrapping key for the first executable and encrypting the prime number generated by the electronic device with the wrapping key of the first executable to generate an encrypted prime number. The method further includes storing the encrypted prime number locally in memory of the electronic device. The encrypted prime number is only decryptable by the first executable but not by the second executable. In some embodiments, the method further includes extracting the encrypted prime number from the memory of the electronic device, obtaining the wrapping key of the first executable, and decrypting the encrypted prime number based on the wrapping key.

In some embodiments, the first executable immediately follows the second executable, and the wrapping key of the first executable is generated by the second executable based on a second identifier of the second executable. Each executable is identified by a respective component identifier including a digest of configuration information of the respective executable. Further, in some embodiments, the method further includes determining the second identifier of the second executable based on a respective component identifier of at least one executable that is immediately connected to the second executable. Alternatively, in some embodiments, the method further includes determining the second identifier of the second executable based on a second component identifier of the second executable, independently of any other executable distinct from the second executable.

In another aspect, a method is implemented for a secure operation at an electronic device having a first executable and a second executable. Each executable has a unique identifier within the electronic device. The method includes extracting an encrypted prime number from memory of the electronic device and generating a wrapping key for the first executable. The method further includes decrypting, by the first executable, the encrypted prime number with the wrapping key of the first executable to retrieve a prime number. The encrypted prime number is only decryptable by the first executable but not the second executable. The method further includes generating, by the first executable, a cryptographic key based on the prime number.

In another aspect, some implementations include an electronic device that includes one or more processors and memory having instructions stored thereon, which when executed by the one or more processors cause the processors to perform any of the above methods.

In yet another aspect, some implementations include a non-transitory computer-readable medium, having instructions stored thereon, which when executed by one or more processors cause the processors to perform any of the above methods.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
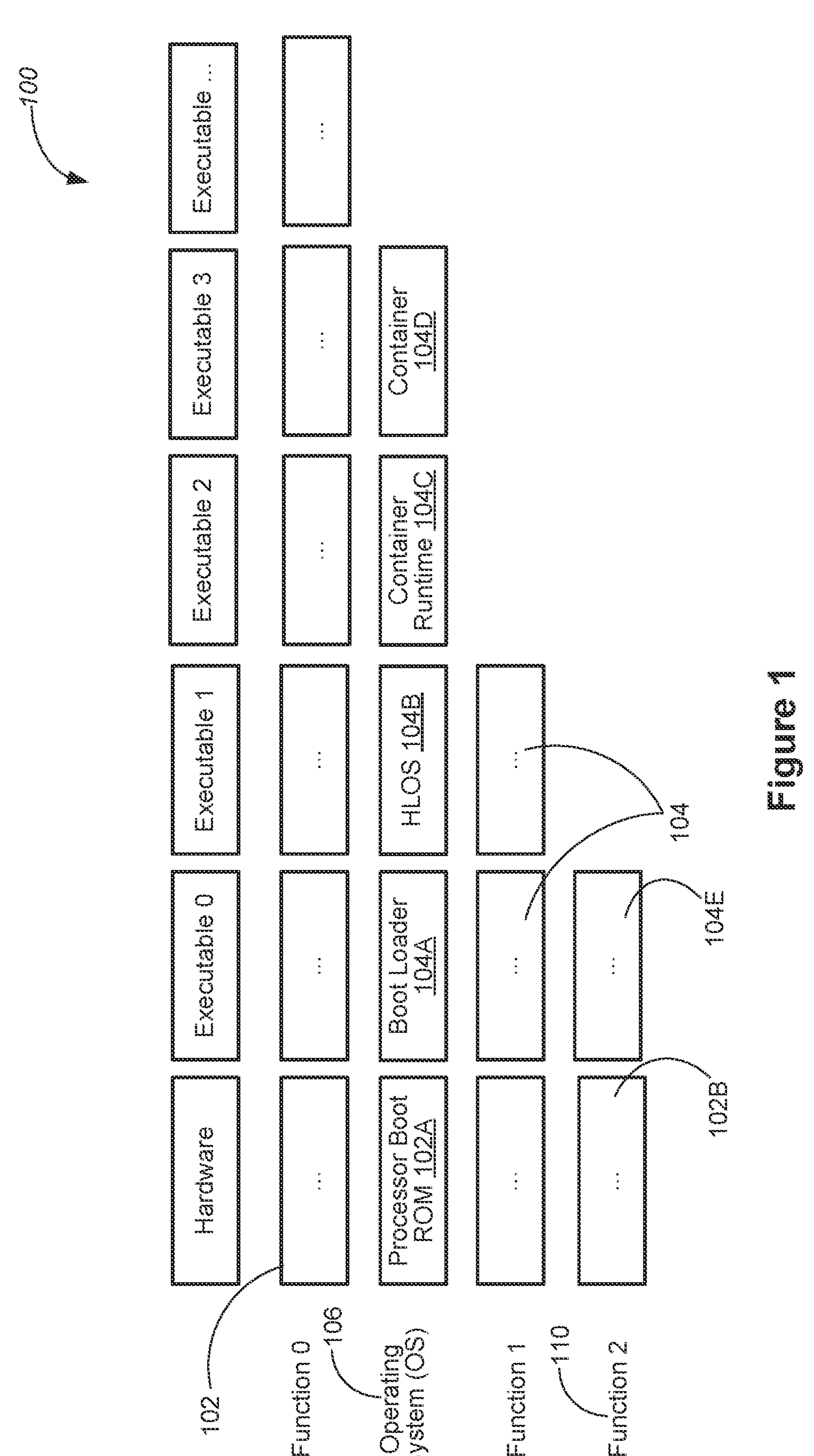
FIG. 1 is a block diagram of an example electronic device, in accordance with some embodiments.

FIG. 1 is a block diagram of an example electronic device 100, in accordance with some embodiments. The electronic device 100 has a plurality of programmable components that are organized into a plurality of executables 104 (also called binaries) in a tree structure. Each executable includes a binary file that is outputted by compilation and contains machine code that runs on the electronic device 100. One or more executables 104 are coupled to a basic hardware module 102 to implement a function. Each executable 104 includes one or more respective components, and each programmable component includes hardware, firmware, software, configuration, or a combination thereof. For example, in some embodiments, an operating system (OS) 106 has the basic hardware module 102A and four additional executables 104A, 104B, 104C, and 104D. The basic hardware module 102A of the OS 106 includes a processor boot read-only memory (ROM). Each of the four additional executables 104A-104D of the OS 106 includes a respective software component, i.e., a boot loader, a high level operating system (HLOS), a container runtime (also called a container engine), or a container. In some embodiments, a functional system 110 only includes a hardware module 102B and a single executable 102E optionally having one or more components. For brevity, labels for hardware modules 102 and executables 104 are selectively applied on a subset (not all) of the hardware modules and executables.

In some embodiments, the electronic device 100 includes an embedded device that has limited resources (particularly, computational resources). Examples of the embedded device include, but are not limited to, a storage device, an Internet of things (IoT) device, an autonomous vehicle, and a surveillance camera. The embedded device is configured to generate one or more prime numbers to facilitate security capabilities including device attestation and data encryption. Generation of prime numbers demands large amount of computational resources, e.g., greater than a threshold number of floating point operations per second (FLOPS), even with hardware acceleration. In some embodiments, the embedded device is coupled to a high-speed serial computer expansion bus, and configured to communicate data via the bus according to a peripheral component interconnect express (PCIe) protocol. The data are encrypted using the one or more prime numbers generated by the embedded device, and the encrypted data are communicated via the bus.

In some embodiments, the electronic device 100 does not generate a prime number on demand immediately before or during a secure operation (e.g., device attestation, software attestation, and data encryption), which relies on the prime number. Instead, the prime number is generated and stored in an encrypted format ahead of time (e.g., during a boot stage), and the electronic device 100 extracts the prime number from its memory in real time during the secure operation. This is critical for an embedded device that has limited computational resources. As such, the embedded device can directly extract, decrypt, and use the prime number that are generated and stored in advance during a secure operation, and does not need to spare its limited computational resources or hold the secure operation for real time prime number generation.

In some embodiments, for each executable 104 of the electronic device 100, one or more respective prime numbers are generated locally, and stored in an encrypted format and in association with the respective executable 104. The electronic device 100 is configured to generate the one or more respective prime numbers in hardware, firmware, or a combination of thereof. In some embodiments, the prime numbers of different executables 104 are generated in a central prime number generator of the electronic device 100. Alternatively, in some embodiments, the prime number(s) of each executable 104 are generated in a local prime number generator of the respective executable 104. Particularly, for each executable 104, the one or more respective prime numbers are only decryptable by the respective executable 104, and not decryptable by any other executables of the electronic device 100, thereby minimizing a chance of being attacked or tampered during retrieval of corresponding encrypted prime numbers.

The electronic device 100 optionally has a single processor core or multiple processor cores. In some embodiments, the electronic device 100 implements a multi-threading process in which the single processor core or multi-core processor of the electronic device 100 provides a plurality of threads of execution concurrently. Further, in some embodiments, each of a subset of the threads of execution includes one or more secure operations of one or more executables. For each secure operation implemented at a respective executable 104, one or more prime numbers are prepared in advance (i.e., prior to the respective secure operation) and extracted for use in the secure operation on demand.

Figure 2:
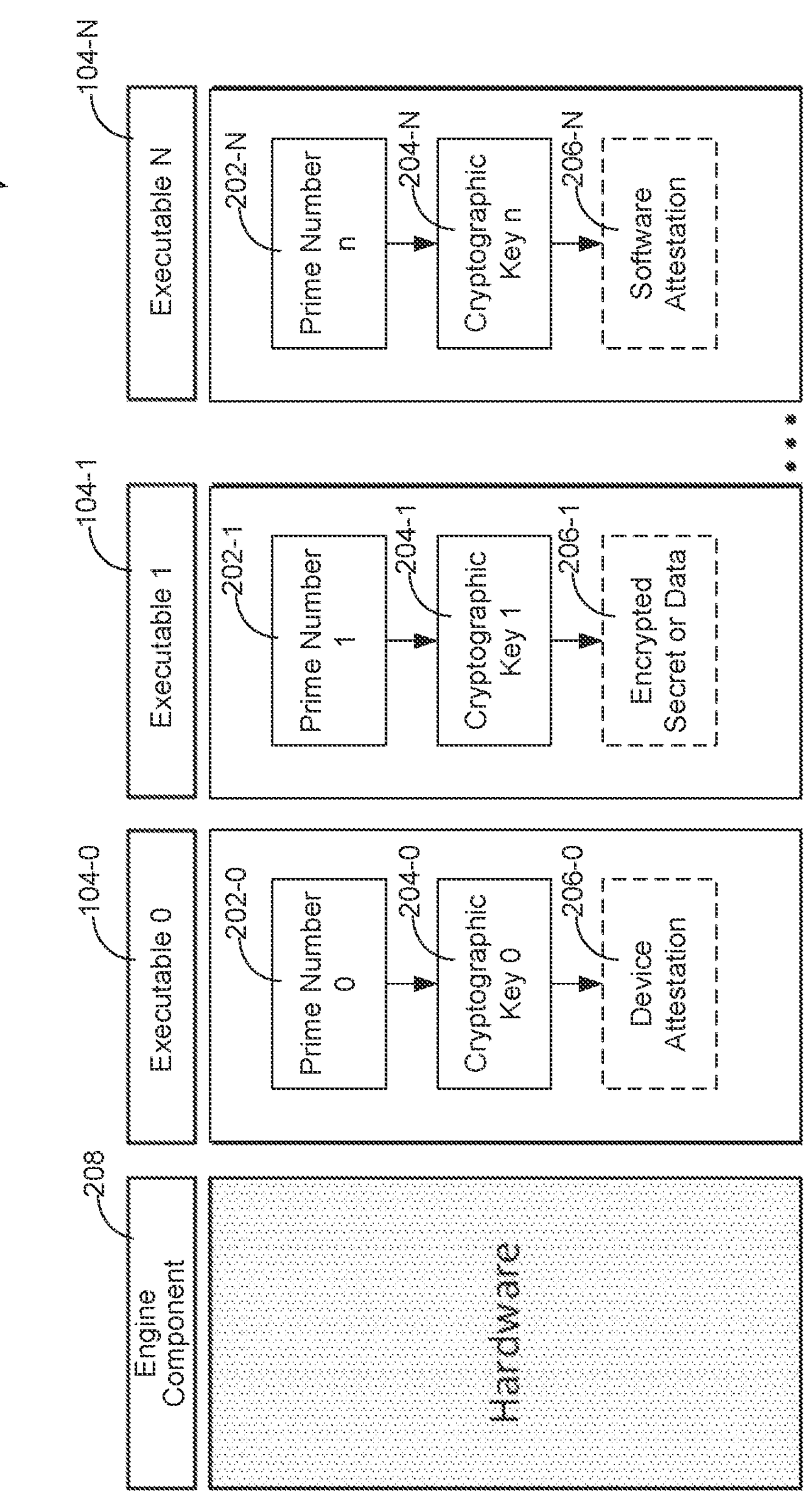
FIG. 2 is a block diagram of an example electronic device having a plurality of executables that use prime numbers in secure operations, in accordance with some embodiments.

FIG. 2 is a block diagram of an example electronic device 100 having a plurality of executables 104-0, 104-1, and 104-N that use prime numbers 202 in secure operations, in accordance with some embodiments. The plurality of executable 104-0, 104-1, and 104-N are ordered to form an ordered sequence of executables 104, where N is an integer. When N is equal to 2 or greater than 2, the sequence of executables 104 includes N+1 executables coupled in series. For clarity, the plurality of executables includes a start executable 104-0, a first executable, . . . , and an N-th executable 104-N. When N is equal to 1, the sequence of executables 104 includes 2 executables coupled to each other. When Nis equal to 0, the sequence of executables 104 includes a single executable (e.g., in a functional system 110 in FIG. 1). In some embodiments, at least a subset (less than all) of the plurality of executables 104-0, 104-1, and 104-N is configured to implement respective secure operations based on respective prime numbers 202. In some embodiments, all of the plurality of executables 104-0, 104-1, and 104-N are configured to implement respective secure operations based on respective prime numbers 202.

For example, a first executable 104-1 corresponds to one or more first prime numbers 202-1. The first executable 104-1 generates a first cryptographic key 204-1 with the one or more first prime numbers 202-1 and performs a first secure operation (e.g., attestation, authentication, certification, or encryption) based on the first cryptographic key 204-1. In some situations, the first cryptographic key 204-1 includes an encryption key used to encrypt a first secret or data item, thereby generating a first encrypted secret or data item 206-1. In some embodiments, a start cryptographic key 204-0 of a start executable 104-0 is generated from a start prime number 202-0 and includes a signature used for attestation 206-0 of the electronic device 100, while an N-th cryptographic key 204-N includes a signature used for attestation 206-N of a software application associated with the N-th executable 104-N. In some embodiments, the same executable 104 (e.g., the first executable 104-1) provides different prime numbers 202 to generate different cryptographic keys 204 to be applied in different secure operations. Alternatively, in some embodiments, one of the plurality of executables 104 (e.g., the first executable 104-1) provides identical prime numbers 202 to generate identical cryptographic keys 204 to be applied in at least two different secure operations.

In some embodiments, the start executable 104-0 starts the sequence of executables 104 and is coupled to an engine component 208 (e.g., a device identifier composition engine (DICE)). The start executable 104-0 is followed by the first executable 104-1, and does not follow any other executable. The engine component 208 has a hardware and firmware capability that performs measurements of code and/or configuration data and generates a cryptographically unique value (i.e., a compound device identifier (CDI)). Specifically, in some embodiments, each executable of the sequence of executables 104 directly or indirectly interacts with the engine component 208 to generate a unique identification of the respective executable and create a wrapping key based on the unique identification for storing a prime number securely in an encrypted format.

Figure 3:
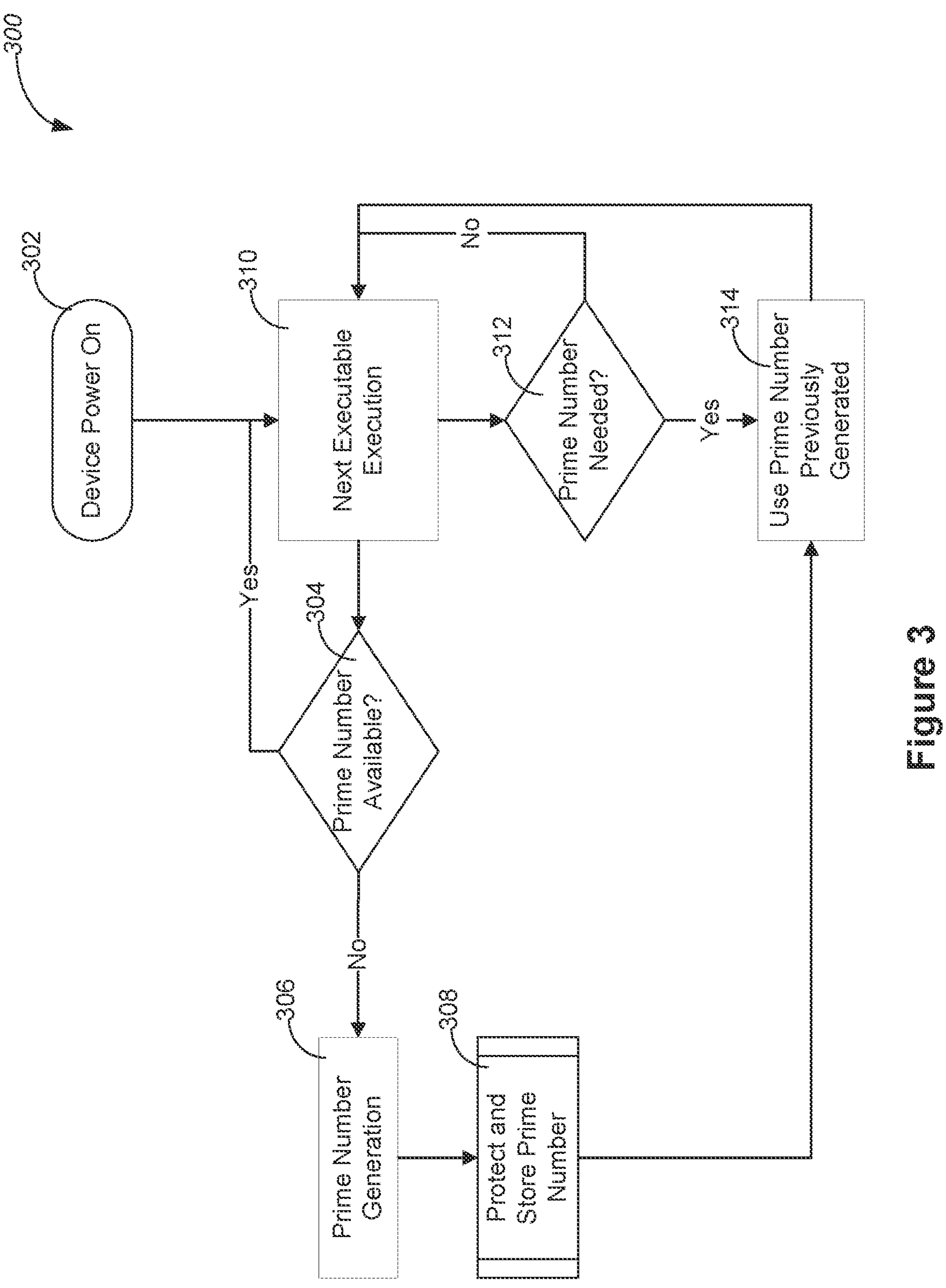
FIG. 3 is a flow diagram of a process of generating, storing, and retrieving a prime number for a secure operation in an executable, in accordance with some embodiments.

FIG. 3 is a flow diagram of a process 300 of generating, storing, and retrieving a prime number 202 for a secure operation in an executable 104, in accordance with some embodiments. In some embodiments, the process 300 can be modified by, for example, having steps rearranged, changed, added, and/or removed. In some embodiments, the process is implemented as an electronic device 100 is powered on (step 302), e.g., in a boot stage. When the electronic device 100 is being powered on (step 302), the electronic device 100 determines (step 304) whether a first prime number 202-1 is available in a first executable 104-1. In accordance with a determination that the first prime number 202-1 is not available for the first executable 104-1, the electronic device 100 generates (step 306) a first prime number 202-1 (as shown in FIG. 2) for the first executable 104-1, which encrypts the first prime number 202-1 and stores (step 308) the first prime number 202-1 in memory of the electronic device 100. Conversely, in accordance with a determination that the first prime number 202-1 is available for the first executable 104-1, the electronic device 100 executes (step 310) a next executable 104, e.g., including determining (step 304) whether a prime number is available in the next executable 104.

Subsequently, during a secure operation associated with the first executable 104-1, the first executable 104-1 determines (step 312) whether the first prime number 202-1 is needed to implement the secure operation. In accordance with a determination that the first prime number 202-1 is needed, the first executable 104-1 uses (step 314) the first prime number 202-1 that was previously generated and is currently stored in an encrypted format. Conversely, In accordance with a determination that the first prime number 202-1 is not needed, the first executable 104-1 continues to be implemented (step 310) without loading the first prime number 202-1, and the next executable 104 is implemented after the first executable 104-1.

In some embodiments, the prime number 202 is generated in this dedicated process 300 in advance (e.g., in a boot stage), independently of any secure operation (e.g., attestation, authentication, certification, and encryption) that uses the prime number 202. Further, in some embodiments, the process 300 is implemented in parallel with other tasks (including a related secure operation) of the electronic device 100. For example, the prime number 202 is being generated and stored while the secure operation is being implemented up to a point of using the prime number 202. Alternatively, in some embodiments, the electronic device 100 does not implement two or more tasks in parallel, and allows the prime numbers 202 that are previously generated to be reused. The process 300 is dedicated to prime number generation, and configured to get the prime number 202 ready in advance, such that the prime number 202 can be directly used in a subsequent secure operation. From a perspective of the secure operation, the prime number 202 is provided as if it is generated locally on demand with a desirable latency. By these means, the process 300 effectively masks an extended latency associated with prime number generation (e.g., reduces a latency of getting prime numbers by 50% or more).

In some embodiments, the process 300 is at least partially implemented for a sequence of executables 104 during boot stages of the electronic device 100. For example, in the boot stages, the first executable 104-1 (FIG. 2) uses cryptographic data (e.g., a wrapping key for encrypting the first prime number 202-1) provided by the start executable 104-0 and presents cryptographic data (e.g., a wrapping key for encrypting a next prime number) to a next executable 104 in the same sequence of executables 104.

Figure 4:
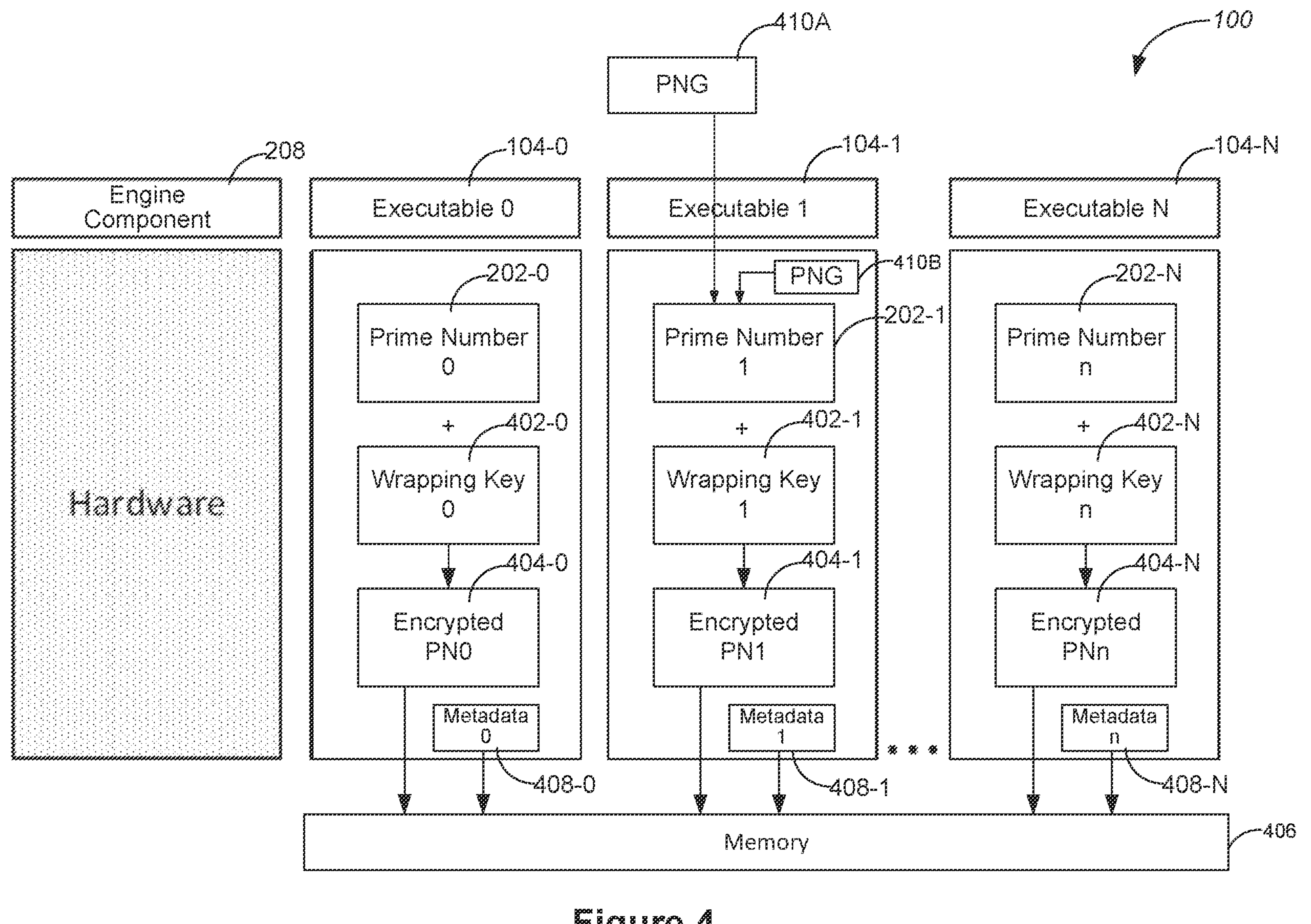
FIG. 4 is a block diagram of another example electronic device having a plurality of executables that prepare prime numbers in an encrypted format, in accordance with some embodiments.

FIG. 4 is a block diagram of another example electronic device 100 having a plurality of executables 104 (e.g., executables 104-0, 104-1, and 104-N) that prepare prime numbers in an encrypted format, in accordance with some embodiments. The plurality of executable 104 are ordered to form an ordered sequence of executables 104, where N is an integer. Although FIG. 4 shows three executables 104-0, 104-1, and 104-N, the sequence of executables 104 optionally includes 1, 2, or more than 2 executables that are coupled in series. The sequence of executables 104 is started with a start executable 104-0, which is directly coupled to an engine component 208 (e.g., a DICE). Each executable 104 has a unique identifier within the electronic device 100. In some embodiments, the electronic device 100 generates a first wrapping key 402-1 for the first executable 104-1. A first prime number 202-1 generated by the electronic device 100 is encrypted with the first wrapping key 402-1 of the first executable 104-1 to generate an encrypted prime number 404-1. The encrypted prime number 404-1 is stored locally in memory 406 of the electronic device 100.

Particularly, the encrypted prime number 404-1 is only decryptable by the first executable 104-1, but not by any other executable 104. In some embodiments, only the first executable 104-1 knows the first wrapping key 402-1 such that the encrypted prime number 404-1 is only decryptable by the first executable 104-1. In some embodiments, the encrypted prime number 404-1 is stored in the memory 406 of the electronic device based on a memory address associated with the first executable 104-1. The memory address is only known to the first executable 104-1. In an example, the first executable 104 includes first metadata 408-1, and the memory address associated with the first executable 14 is determined based on the first metadata 408-1. The first metadata 408-1 is only known to the first executable 104-1, allowing the first executable 104-1 (not any other executable 104) to retrieve the encrypted prime number 404-1 stored in the memory address determined from the first metadata 408-1.

In some embodiments, the prime number 202-1 is generated by a prime number generator 410A shared by two or more executables 104 and encrypted locally by the first executable 104-1. Alternatively, in some embodiments, the first executable 104-1 includes a prime number generator 410B that generates the first prime number 202-1 locally, while encrypting the first prime number 202-1 locally by the first executable 104-1. In some embodiments, a cryptographic function (e.g., key derivation and an associated secure operation) is performed using the first prime number 202-1 for the first executable 104-1. Further, in some implementations, the cryptographic functions of two or more executables 104 are centralized and performed by a central cryptographic module. The central cryptographic module performs the cryptographic function using the first prime number 202-1 for the first executable 104-1. Alternatively, in some embodiments, each executable 104 has a respective cryptographic module to perform the cryptographic function. An embedded cryptographic module of the first executable 104 performs the cryptographic function using the first prime number 202-1 locally.

In some embodiments, the first executable 104-1 subsequently implements a secure operation using the first prime number 202-1. The first executable 104-1 extracts the encrypted prime number 404-1 from the memory 406 of the electronic device 100, obtains the first wrapping key 402-1 of the first executable 104-1, and decrypts the encrypted prime number 404-1 based on the first wrapping key 402-1. In some situations, the first wrapping key 402-1 is stored securely and used directly during prime number decryption. Alternatively, in some situations, the first wrapping key 402-1 is generated on demand every time the first prime number 202-1 is encrypted and decrypted.

In some embodiments, the memory 406 where the encrypted prime number 404-1 is stored includes a volatile memory unit, and the encrypted prime number 404-1 is stored in the volatile memory unit of the memory 406 of the electronic device 100. Examples of the volatile memory unit include, but are not limited to, dynamic random-access memory (DRAM) and static random access memory (SRAM). Alternatively, in some embodiments, the memory 406 where the encrypted prime number 404-1 is stored includes a non-volatile memory unit, and the encrypted prime number 404-1 is stored in the non-volatile memory unit of the memory 406 of the electronic device 100. For example, in some embodiments, in the non-volatile memory unit, data are stored in floating-gate memory cells including floating-gate metal-oxide-semiconductor field-effect transistors (MOSFETs). The non-volatile memory unit includes flash memory storage such as NAND flash and solid-state drives (SSDs). Other examples of the non-volatile memory unit include read-only memory (ROM), erasable programmable ROM (EPROM) and electrically erasable programmable ROM (EEPROM), ferroelectric RAM, and other types of data storage devices (e.g., disk storage, hard disk drives, optical discs, floppy disks, and magnetic tape).

Figure 5:
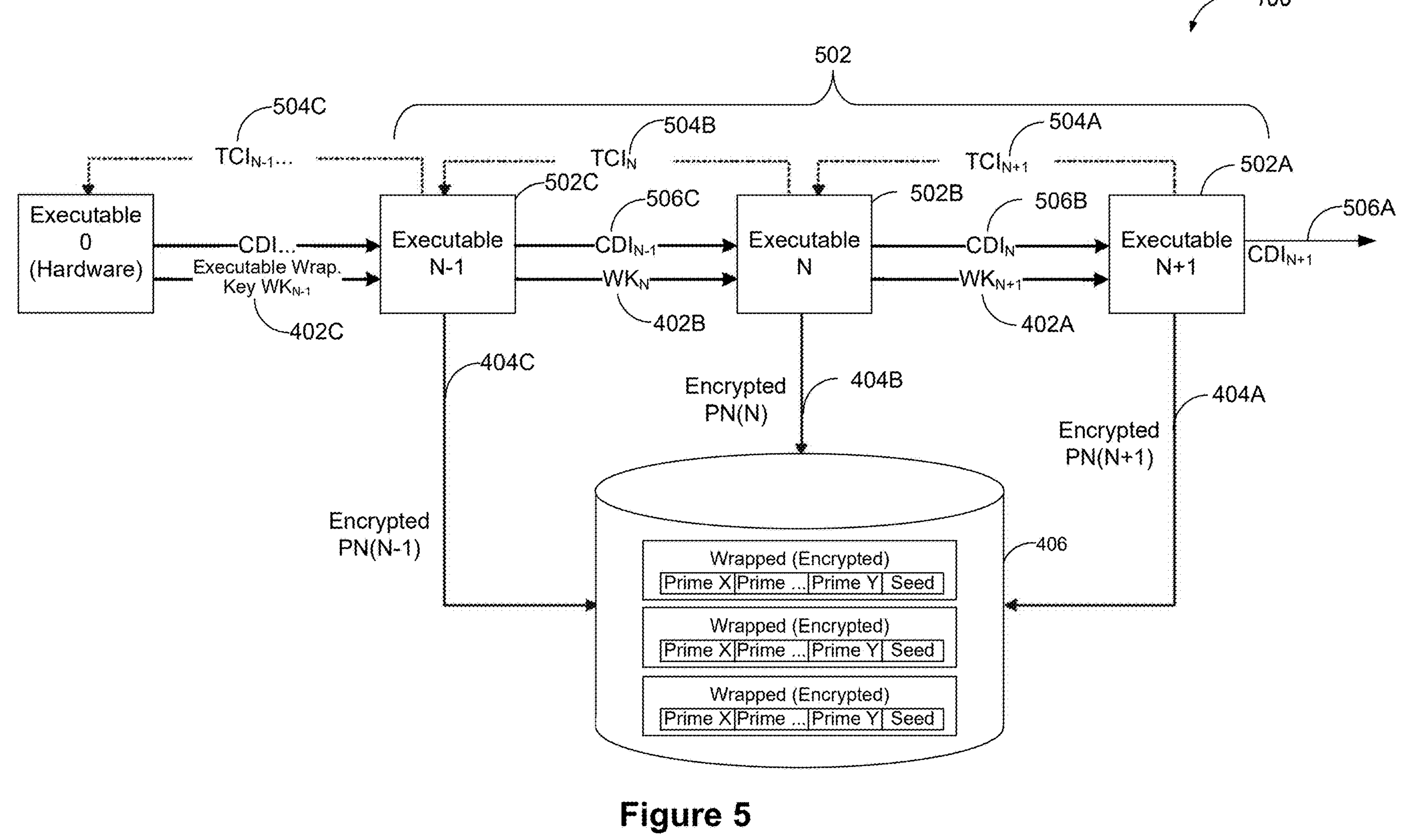
FIG. 5 is a block diagram of an electronic device that encrypts a prime number of an executable in a set of successive executables, in accordance with some embodiments.

FIG. 5 is a block diagram of an electronic device 100 that encrypts a prime number of an executable in a set of successive executables 502, in accordance with some embodiments. The set of successive executables 502 includes three successive executables 104 (FIG. 2), e.g., an (N+1)-th executable, an N-th executable, and an (N−1)-th executable, where N is an integer that is equal to 1 or a larger integer. For convenience, the (N+1)-th, N-th, and (N+1)-th executables are also called a first executable 502A, a second executable 502B, and a third executable 502C. The first executable 502A immediately follows the second executable 502B, and the second executable immediately follows the third executable 502C. Each of the first, second, and third executables 502A, 502B, and 502C provides a respective encrypted prime number, e.g., a first encrypted prime number 404A, a second encrypted prime number 404B, or a third encrypted prime number 404C. The encrypted prime numbers 404A-404C are stored in memory 406 of the electronic device 100.

The first executable 502A encrypts a first prime number generated by a prime number generator 410 of the electronic device 100 by a first wrapping key 402A. In some embodiments, the first wrapping key 402A of the first executable 502A is provided by the second executable 502B that is immediately followed by the first executable 502A. That said, the second executable 502B generates the first wrapping key 402A of the first executable 502A, and provides the first wrapping key 402A to the first executable 502A, thereby allowing the first executable 502A to encrypt the first prime number with the first wrapping key 402A of the first executable 502A. Additionally, in some embodiments not shown, the second executable 502B obtains a random number and generates the first wrapping key 402A for the first executable 502A based on both the random number and a second identifier of the second executable 502B.

In some embodiments, each executable 502 of the electronic device 100 is identified by a respective component identifier 504 including a digest (e.g., a hash) of configuration information of the respective executable 502. The configuration information includes information of one or more of: firmware, configuration, vendor name, product information, version, Security Version Number (SVN), and an instance identifier of the respective executable. The first executable 502A, second executable 502B, and third executable 502C are identified by a first component identifier 504A, second component identifier 504B, third component identifier 504C, respectively. In some situations, each of the executables 502A-502C provides a respective component identifier 504A-504C to a distinct executable immediately followed by the respective executable, e.g., the first executable 502A provides its first component identifier 504A to the second executable 502B.

In some embodiments, the first wrapping key 402A of the first executable 502A is generated by the second executable 502B based on a second identifier of the second executable 502B, which is immediately followed by the first executable 502A. Further, in some embodiments, the second identifier of the second executable 502B is determined based on the second component identifier 504B of the second executable 502B, independently of any other executable distinct from the second executable. Thus, the first wrapping key 402A of the first executable 502A is generated by the second executable 502B based on the second component identifier 504B of the second executable 502B. In some embodiments, the second identifier of the second executable 502B is determined based on a respective component identifier of at least one executable that is immediately connected to the second executable 502B, i.e., based on the first component identifier 504A, the third component identifier 504C, or both. Thus, the first wrapping key 402A of the first executable 502A is generated by the second executable 502B based on the first component identifier 504A, the third component identifier 504C, or both. In an example, the first wrapping key 402A of the first executable 502A is generated by the second executable 502B based on at least the first component identifier 504A of the first executable 502A.

In some embodiments, each executable 502 of the electronic device 100 is identified by a respective compound device identifier 506. The first executable 502A, second executable 502B, and third executable 502C are identified by a first compound device identifier 506A, second compound device identifier 506B, third compound device identifier 506C, respectively. In some situations, each of the executables 502A-502C provides a respective compound device identifier 506A-506C to a distinct executable immediately following the respective executable. For example, the third executable 502C provides its third compound device identifier 506C to the second executable 502B, and the second executable 502B provides its second compound device identifier 506B to the first executable 502A. In some embodiments, upon receiving the third compound device identifier 506C and the first component identifier 504A, the second executive 502B generates the second compound device identifier 506B from the third compound device identifier 506C and the first component identifier 504A. Further, in some embodiments, the second executable 502B generates the first wrapping key 402A for the first executable 502A based on the second compound device identifier 506B.

Figure 6:
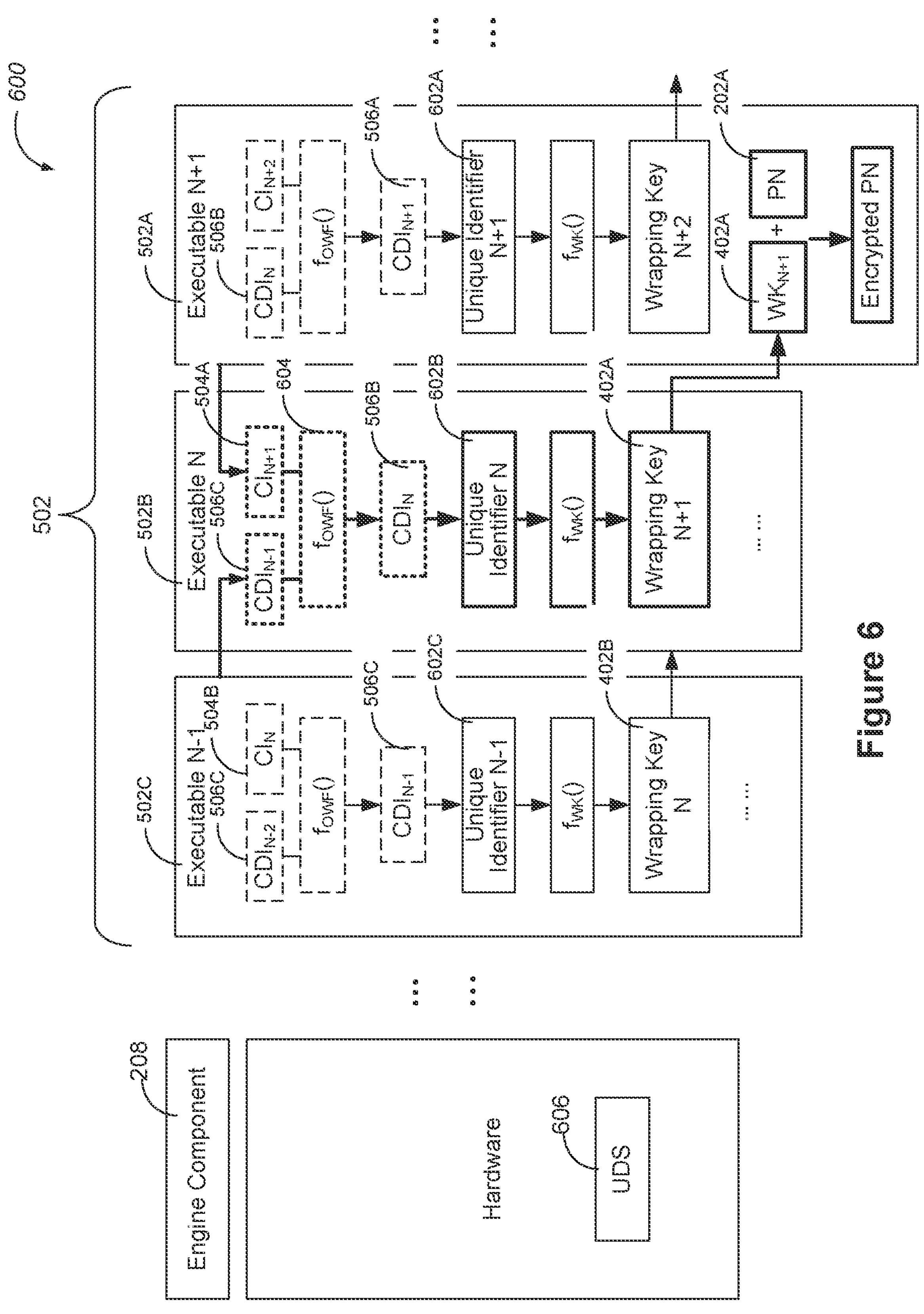
FIG. 6 is a flow diagram of a process for encrypting a prime number of an executable in a set of successive executables, in accordance with some embodiments.

FIG. 6 is a flow diagram of a process 600 for encrypting a prime number of an executable in a set of successive executables 502, in accordance with some embodiments. The set of successive executables 502 includes three successive executables 104, e.g., an (N+1)-th executable, an N-th executable, and an (N−1)-th executable in FIGS. 2, 4 and 7, where N is an integer that is equal to 1 or a larger integer. For convenience, the (N+1)-th, N-th, and (N−1)-th executables are also called a first executable 502A, a second executable 502B, and a third executable 502C. The first executable 502A immediately follows the second executable 502B, and the second executable immediately follows the third executable 502C. Each of the first, second, and third executables 502A, 502B, and 502C provides a respective encrypted prime number 404, e.g., a first encrypted prime number 404A, a second encrypted prime number 404B, or a third encrypted prime number 404C. The encrypted prime numbers 404A-404C are stored in memory 406 of the electronic device 100 (FIG. 5). In some embodiments, the first executable 502A is an intermediate executable followed by at least one additional executable in a sequence of executables 104 (FIG. 2). Alternatively, in some embodiments, the first executable 502A is a last executable in the sequence of executables 104, and not followed by any additional executable.

Each executable 502A, 502B, or 502C has a unique identifier 602 (e.g., a component identifier 504A, 504B, or 504C, a compound device identifier 506A, 506B, or 506C) within the electronic device 100. Each executable 502A, 502B, or 502C encrypts respective prime numbers 202 using a respective wrapping key 402 provided by a distinct executable followed by the respective executable. Specifically, the first executable 502A encrypts a first prime number 202A using a first wrapping key 402A provided by the second executable 502B. In some embodiments, the second executable 502B generates the first wrapping key 402A for the first executable 502A based on its own unique identifier(s) 602B (e.g., the component identifier 504B, the compound device identifier 506B). More broadly, in some embodiments, the second executable 502B generates the first wrapping key 402A for the first executable 502A based on a subset of the unique identifiers 602B of the set of successive executables 502 (e.g., component identifiers 504A-504C, compound device identifiers 506A-506C).

Specifically, in some embodiments, the second identifier 602B of the second executable 502B includes a second compound device identifier 506B of the second executable 502B. The second executable 502B obtains a third compound device identifier 506C of a third executable 502C followed by the second executable 502B and a first component identifier 504A of the first executable 502A following the second executable 502B. The second compound device identifier 506B of the second executable 502B is generated based on the third compound device identifier 506C of the third executable 502C and the first component identifier 504A of the first executable 502A, e.g., using a one-way function $f_{OWF}$ 604. The second executable 502B generates the first wrapping key 402A for the first executable 502A based on the second compound device identifier 506B, and provides the first wrapping key 402A to the first executable 502A.

During prime number preparation, the first executable 502A encrypts the first prime number 202A with the first wrapping key 402A to generate an encrypted prime number 404A to be stored in the memory 406 of the electronic device 100. During a subsequent secure operation, the first executable 502A retrieves the encrypted prime number 404A from the memory 406, obtains the first wrapping key 402A from the second executable 502B, and decrypts the encrypted prime number 404A based on the first wrapping key 402A to recover the first prime number 202A. The recovered first prime number 202A is used by the first executable 502A for attestation, authentication, certification, or encryption as if the first prime number 202 is generated in real time for the secure operation.

In some embodiments, the engine component 208 includes a unique device secret (UDS) 606, and the UDS 606 is a unique secret value specific to the electronic device 100. The third executable 502C immediately follows the engine component 208, and the compound device identifier 506C ($CDI_{N-2}$) is equal to the UDS 606. This allows the executables 502A-502C to have a tie to hardware of the electronic device 100 and have a capability of deriving the wrapping keys used for this electronic device 100.

Figure 7:
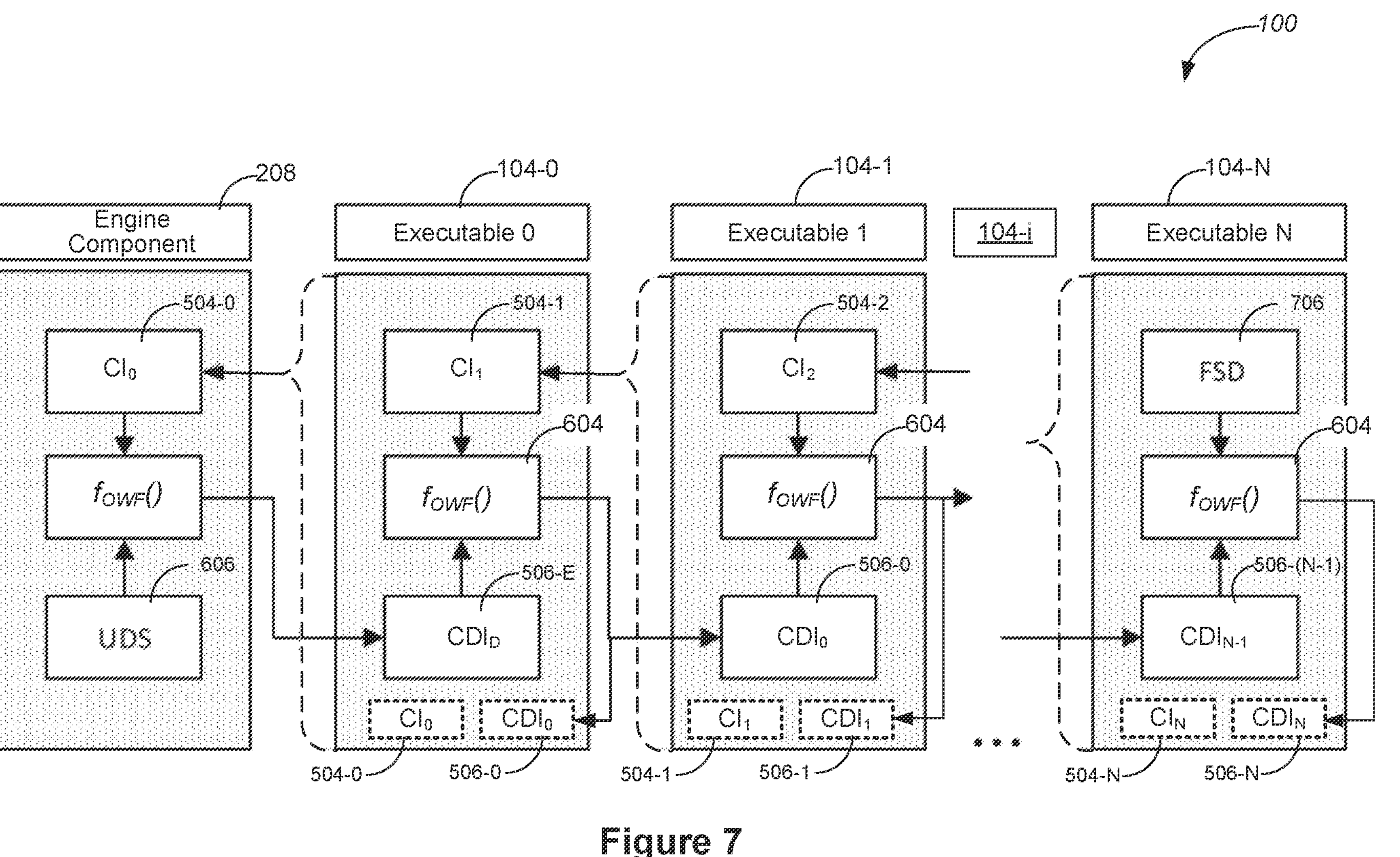
FIG. 7 is a block diagram of an example electronic device having a plurality of executables each having a unique identifier, in accordance with some embodiments.

FIG. 7 is a block diagram of an example electronic device 100 having a plurality of executables 104 each having a unique identifier, in accordance with some embodiments. The plurality of executable 104 are ordered to form an ordered sequence of executables 104, where N is an integer. Although FIG. 7 shows three executables 104-0, 104-1, and 104-N, the sequence of executables 104 optionally includes 1, 2, or more than 2 executables that are coupled in series. Each executable 104 has a unique identifier 602 (e.g., a component identifier 504, a compound device identifier 506) within the electronic device 100. Specifically, a start executable 104-0 is directly coupled to an engine component 208, and has a start unique identifier (e.g., a component identifier 504-0 and a compound device identifier 506-0). A first executable 104-1 immediately follows the start executable 104-0, and has a first unique identifier (e.g., a first component identifier 504-1 and a first compound device identifier 506-1). An N-th executable 104-N has an N-th unique identifier (e.g., an N-th component identifier 504-N and an N-th compound device identifier 506-N).

For each executable 104-0, 104-1, or 104-N, the respective component identifier 504-0, 504-1, or 504-N includes a digest (e.g., a hash) of configuration information of the respective executable 104-0, 104-1, or 104-N, e.g., independently of any other executable. For each executable 104-0, 104-1, or 104-N, the configuration information includes information of one or more of: firmware, configuration, vendor name, product information, version, SVN, and an instance identifier of the respective executable 104-0, 104-1, or 104-N.

In some embodiments, for each executable 104, the respective compound device identifier 506 combines the component identifier 504 of a next executable 104 and the compound device identifier 506 of a previous executable 104, e.g., using a one-way function $f(\,)_{OWF}$ 604. Specifically, the first compound device identifier 506-1 is a combination of a second component identifier 504-2 of a second executable (not shown) immediately following the first executable 104-1 and the compound device identifier 506-0 of the start executable 104-0 followed by the first executable 104-1. For the start executable 104-0 immediately following the engine component 208, the compound device identifier 506-0 is a combination of the first component identifier 504-1 of the first executable 104-1 immediately following the start executable 104-0 and an engine identifier 506-E of the engine component 208, which is a combination of a unique device secret (UDS) 606 and a component identifier 504-0 of the start executable 104-0. The UDS 606 is a unique secret value specific to the electronic device 100. In some embodiments, the UDS 606 is loaded to a non-volatile memory of the electronic device 100 during manufacturing. Alternatively, in some embodiments, the UDS 606 is generated internally in the electronic device 100 during device provisioning.

In some embodiments, the N-th executable 104-N is a last executable that is not followed by any other executable in the sequence of executables 104. The N-th compound device identifier 506-N is a combination of a firmware security descriptor 706 of the N-th executable 104-N and an (N−1)-th compound device identifier 506-(N−1) of an (N−1)-th executable (not shown) immediately followed by the N-th executable 104-N. The firmware security descriptor 706 of the N-th executable 104-N defines security characteristics of device firmware associated with the N-th executable 104-N.

In some embodiments, each i-th intermediate executable 104-*i* follows an (i−1)-th executable and is followed by an (i+1)-th executable in the sequence of executables 104. Each i-th intermediate executable 104-*i* generates a next wrapping key 402 for the (i+1)-th executable based on its own unique identifier(s) 602 (e.g., the component identifier 504 and compound device identifier 506 of the i-th intermediate executable 104-*i*). More broadly, in some embodiments, each i-th intermediate executable 104-*i* generates a next wrapping key 402 for the (i+1)-th executable based on a subset of the unique identifiers 602 of the (i−1)-th, i-th, and (i+)-th executables 502 (e.g., their component identifiers 504 and compound device identifiers 506). For example, each i-h intermediate executable 104-*i* generates the wrapping key for the (i+1)-th executable based on its compound device identifier 506, which combines the component identifier 504 of the (i+1)-th executable and the compound device identifier 506 of the (i−1)-th executable, e.g., using the one-way function $f(\,)_{OWF}$ 604.

Figure 8A:
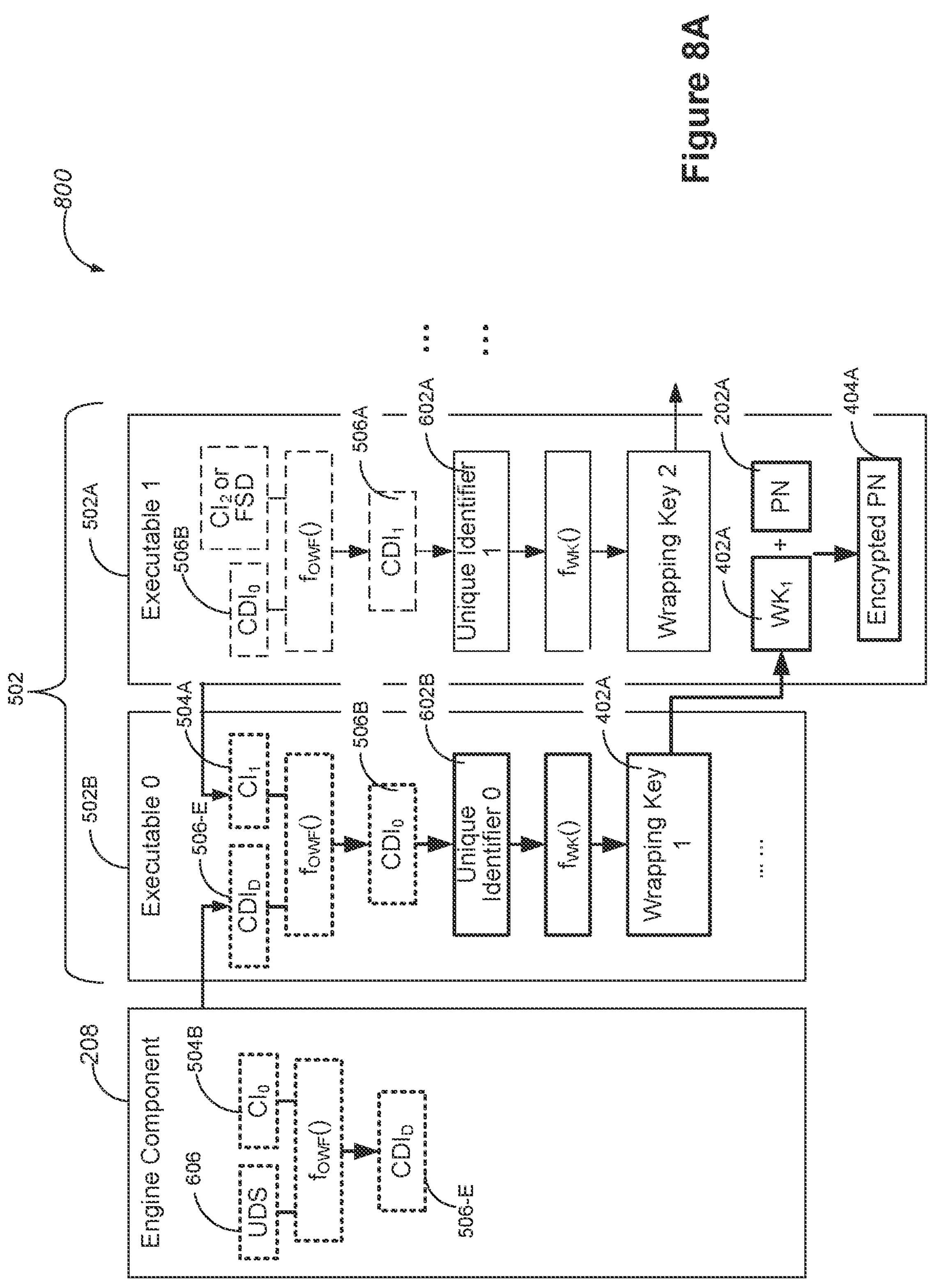
FIG. 8A is a flow diagram of a process for encrypting a first prime number of a first executable that immediately follows a second executable following an engine component, in accordance with some embodiments.

FIG. 8A is a flow diagram of a process 800 for encrypting a first prime number 202A of a first executable 502A that immediately follows a second executable 502B following an engine component 208, in accordance with some embodiments. A set of successive executables 502 includes two successive executables, e.g., a first executable 502A immediately following a second executable 502B. The second executable 502B immediately follows the engine component 208. The second executable 502B generates a first wrapping key 402A for the first executable 502A based on a second identifier 602B of the second executable 502B, and provides the first wrapping key 402A to the first executable 502A. The first executable 502A encrypts the first prime number 202A to an encrypted prime number 404A and stores the encrypted prime number 404A in memory 406 of the electronic device 100. In some embodiments, the first executable 502A is followed by at least one additional executable in a sequence of executables 104 (FIG. 2). Alternatively, in some embodiments, the first executable 502A is a last and only executable in the sequence of executables 104, and is not followed by any additional executable.

In some embodiments, the second identifier 602B of the second executable 502B includes a second compound device identifier 506B of the second executable 502B. The second executable 502B obtains a first component identifier 504A of the first executable 502A and determines the second compound device identifier 506B of the second executable 502B based on the first component identifier 504A of the first executable 502A and a UDS 606 of the engine component 208. Specifically, in some embodiments, the engine component 208 combines the second component identifier 504B of the second executable 502B and the UDS 606 of the engine component 208 to generate an engine identifier 506-E of the engine component 208, and the second executable 502B combines the engine identifier 506-E of the engine component 208 and the first component identifier 504A of the first executable 502A to generate the second compound device identifier 506B of the second executable 502B.

Figure 8B:
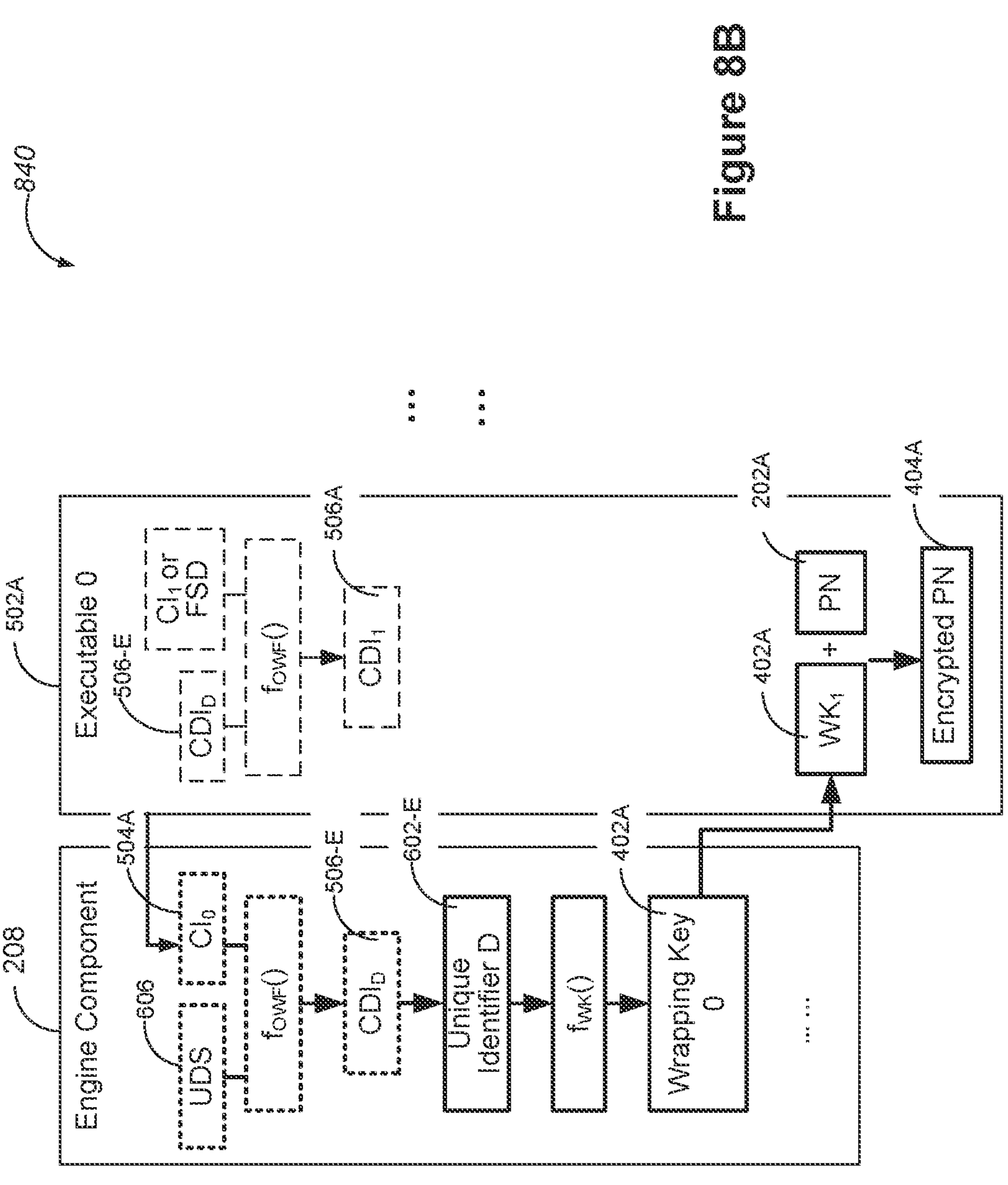
FIG. 8B is a flow diagram of a process for encrypting a first prime number of a first executable that immediately follows an engine component, in accordance with some embodiments.

FIG. 8B is a flow diagram of a process 840 for encrypting a first prime number 202A of a first executable 502A that immediately follows an engine component 208, in accordance with some embodiments. The engine component 208 generates a first wrapping key 402A for the first executable 502A based on a UDS 606 of the engine component 208, and provides the first wrapping key 402A to the first executable 502A. Specifically, in some embodiments, the engine component 208 combines the UDS 606 and a first component identifier 504A of the first executable 502A to generate an engine identifier 506-E, which is a unique identifier 602-E of the engine component 208 applied to generate the first wrapping key 402A. The first executable 502A receives the first wrapping key 402A from the engine component 208, encrypts the first prime number 202A with the first wrapping key 402A to generate an encrypted prime number 404A, and stores the encrypted prime number 404A in memory 406 of the electronic device 100. In some embodiments, the first executable 502A is followed by at least one additional executable in a sequence of executables 104 (FIG. 2). Alternatively, in some embodiments, the first executable 502A is a last and only executable in the sequence of executables 104, and is not followed by any additional executable.

Figure 9A:
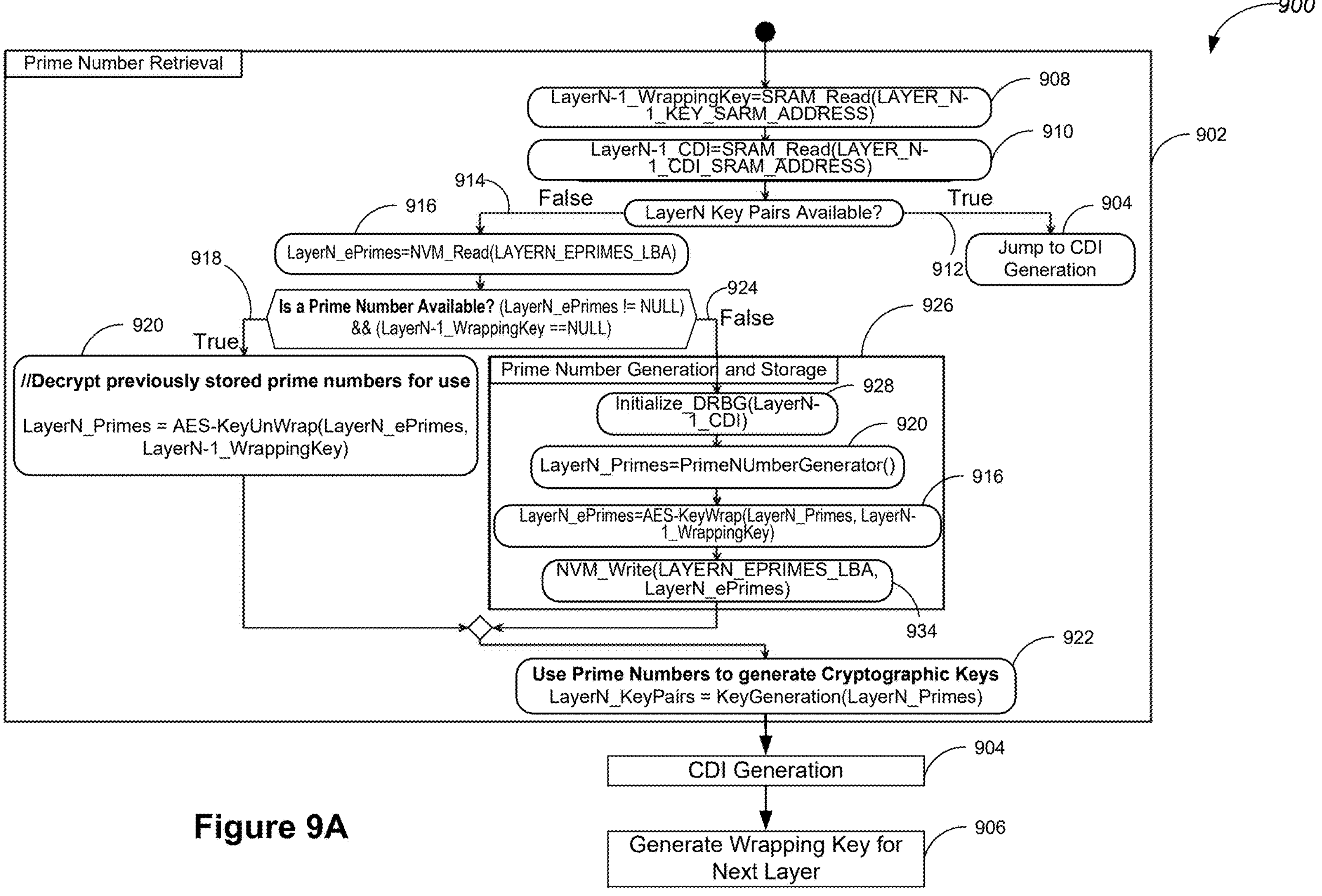
FIGS. 9A-9C illustrate a flow diagram of a device attestation process implemented by an executable based on a pre-stored prime number, in accordance with some embodiments.
Figure 9B:
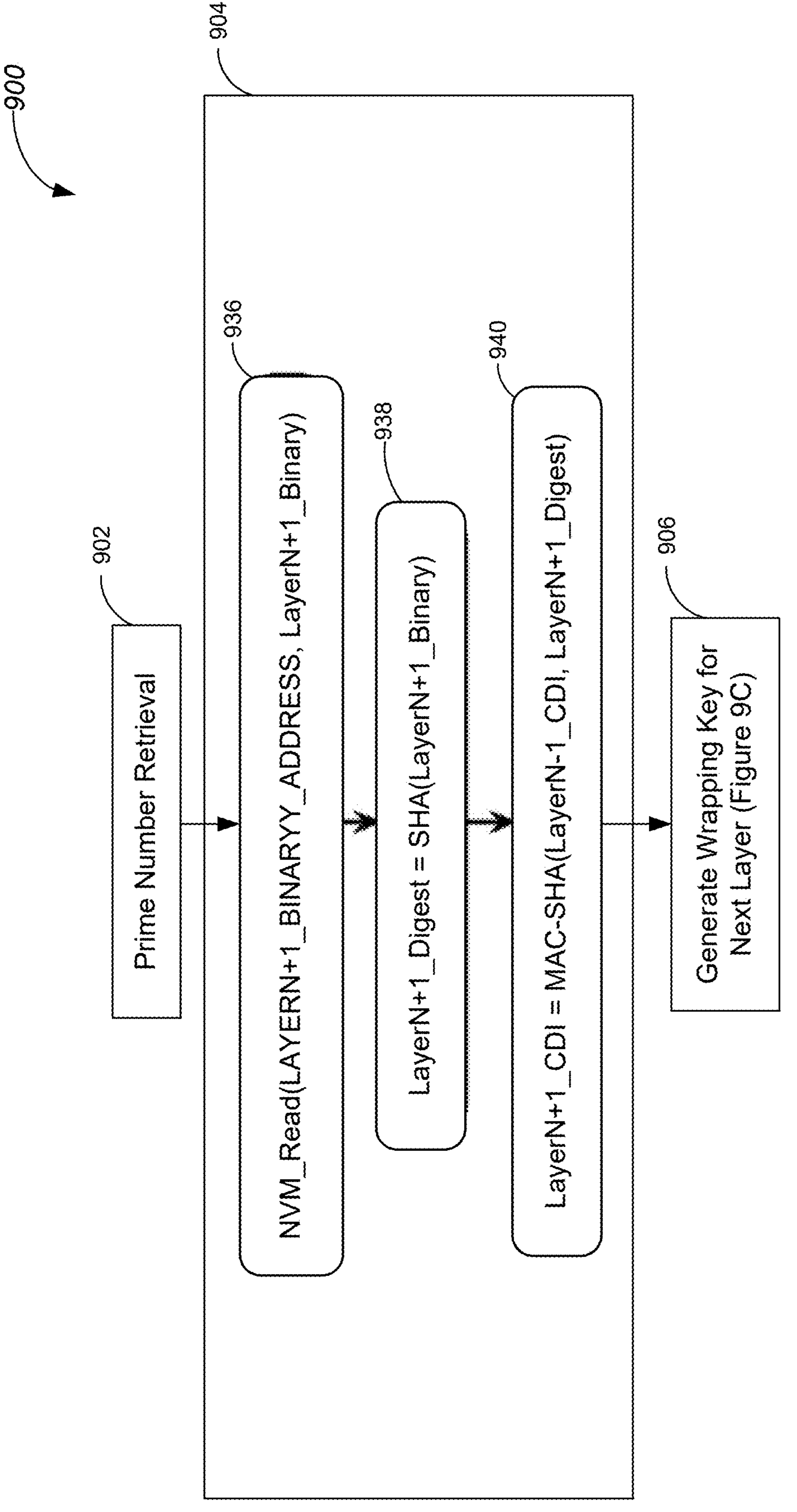
Figure 9C:
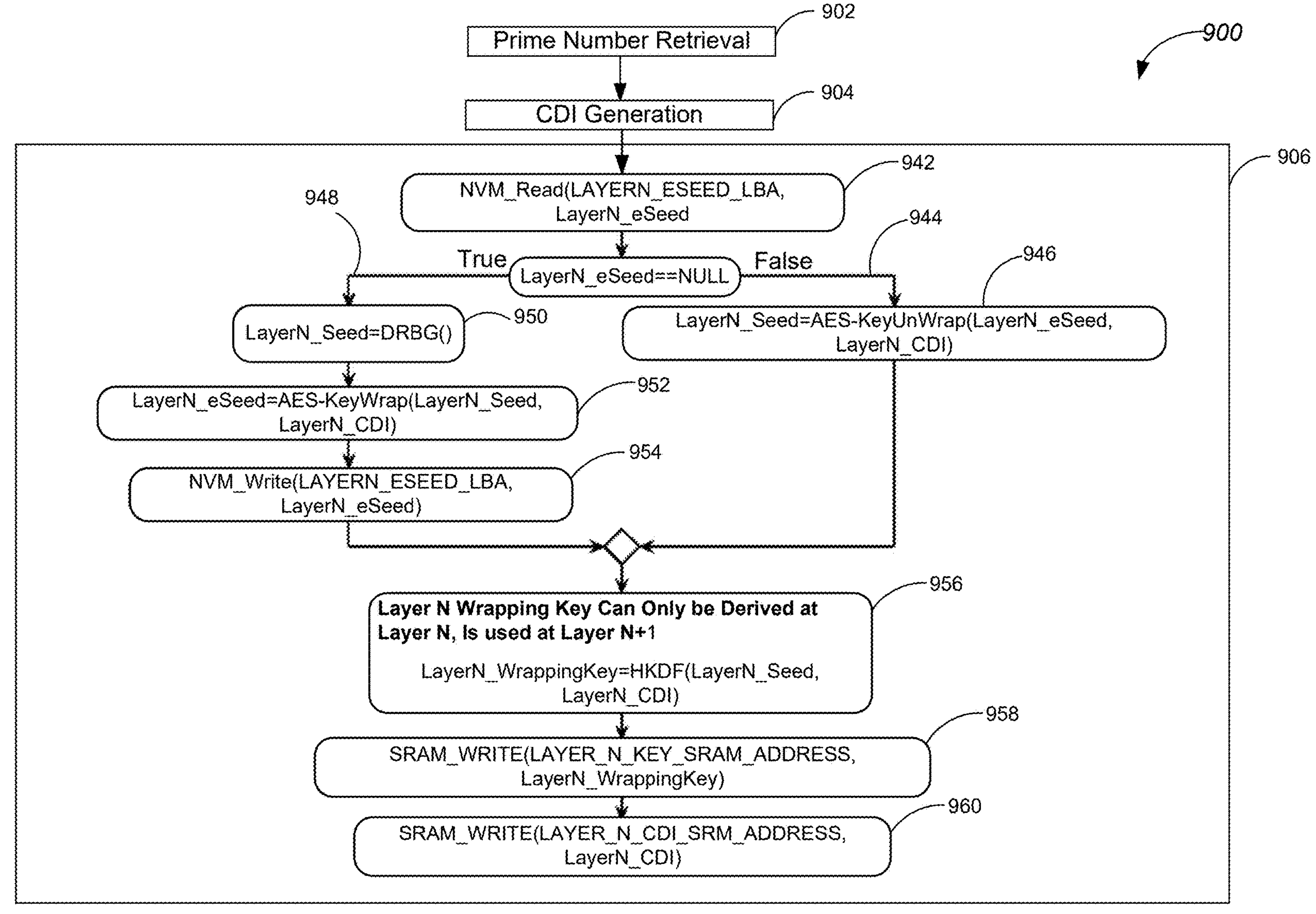

FIGS. 9A-9C illustrate a flow diagram of a device attestation process 900 implemented by an executable based on a pre-stored prime number, in accordance with some embodiments. The device attestation process 900 includes retrieving (step 902) a prime number of an N-th executable, determining (step 904) a unique identifier (e.g., a compound device identifier) of the N-th executable, and generating (step 906) a wrapping key for the (N+1)-th executable. The (N−1)-th executable, N-th executable, and (N+1)-th executable are successive executables in a sequence of executables 104 (FIGS. 2, 4, and 7). In some embodiments, the device attestation process 900 is executed with the N-th executable during a boot stage of the electronic device 100, and corresponds to boot segment execution of the N-th executable.

Referring to FIG. 9A, for retrieval (step 902) of the prime number of the N-th executable, a wrapping key 908 generated by the (N−1)-th executable and a compound device identifier 910 of the (N−1)-th executable are extracted from the memory 406 of the electronic device 100 (e.g., a SRAM unit). In accordance with a determination (step 912) that cryptographic keys 204 are available for the N-th executable, a unique identifier (e.g., a compound device identifier) of the N-th executable is determined (step 904). In accordance with a determination (step 914) that cryptographic keys 204 are not available for the N-th executable, an encrypted prime number 916 of the N-th executable is extracted from a non-volatile memory. In accordance with a determination (step 918) that the wrapping key 908 generated by the (N−1)-th executable and encrypted prime number 916 of the N-th executable are available, the encrypted prime number 916 of the N-th executable is decrypted by the wrapping key 908 generated by the (N−1)-th executable to generate a prime number 920 of the N-th executable. The prime number 920 of the N-th executable are applied to generate cryptographic keys 922 for the N-th executable.

Conversely, in accordance with a determination (step 924) that the wrapping key 908 generated by the (N−1)-th executable or encrypted prime number 916 of the N-th executable is not available, the prime number 920 of the N-th executable is prepared (step 926) by obtaining a compound device identifier 928 of the (N−1)-th executable, generating the prime number 920 for the N-th executable, encrypting the prime number 920 for the N-th executable with the wrapping key 908 provided by the (N−1)-th executable, and storing (step 930) the encrypted prime number 916 in memory 406 of the electronic device (e.g., a non-volatile memory unit).

Referring to FIG. 9B, for determination (step 904) of the unique identifier of the N-th executable, an (N+1)-th executable is loaded (step 936) from the non-volatile memory unit, and a digest 938 (e.g., corresponding to a component identifier) of the (N+1)-th executable is determined. A component identifier of the (N+1)-th executable corresponds to the digest 938 of the (N+1)-th executable. A compound device identifier 940 of the N-rh executable is a combination of the digest 936 of the (N+1)-th executable and a compound device identifier 910 of the (N−1)-th executable.

Referring to FIG. 9C, for generation (step 906) of the wrapping key for the (N+1)-th executable, an encrypted seed 942 of the N-th executable is extracted from the non-volatile memory. In accordance with a determination (step 944) that the encrypted seed 942 of the N-th executable is available, the encrypted seed 942 is decrypted based on the compound device identifier 940 of the N-th executable to generate a seed 946 for the N-rh executable. Conversely, in accordance with a determination (step 948) that the encrypted seed 942 of the N-th executable is not available from the non-volatile memory, a new seed 946 for the N-th executable is generated (step 950), e.g., by a random number generator. The seed 946 for the N-th executable is encrypted (step 952) based on the compound device identifier 940 of the N-th executable to generate an encrypted seed 942, which is stored (step 954) to the non-volatile memory. The wrapping key 956 for the (N+1)-th executable is generated by the N-th executable based on the seed 946 for the N-th executable and the compound device identifier 940 of the N-th executable. The wrapping key 956 for the (N+1)-th executable is stored (step 958) in an SRAM, so is (step 960) the compound device identifier 940 of the N-th executable.

In some embodiments, the device attestation process 900 is implemented by an embedded device that supports a multi-tasking environment. Each boot stage includes a dedicated task for prime number generation and storage. During a subsequent secure operation for attestation, authentication, certification, or encryption, one or more respective prime numbers are made available for each corresponding executable by accessing the memory 406 of the embedded device. The prime number 920 of the N-th executable is reusable before a boot segment of the N-th executable is changed, e.g., via a firmware update. By these means, the prime number(s) are made readily available and do not need to be generated on demand, thereby conserving limited computational resources of the embedded device.

In some embodiments, the prime number 920 of the N-th executable is encrypted with the wrapping key 908 generated by the (N−1)-th executable, such that if the N-th executable is altered intentionally or maliciously, the prime number 920 of the N-th executable as previously generated is not available any longer. In some embodiments, the cryptographic keys 922 and wrapping key 908 of the N-th executable are stored in volatile memory, thereby protecting these keys against any attacker who only inspects non-volatile memory.

Figure 10A:
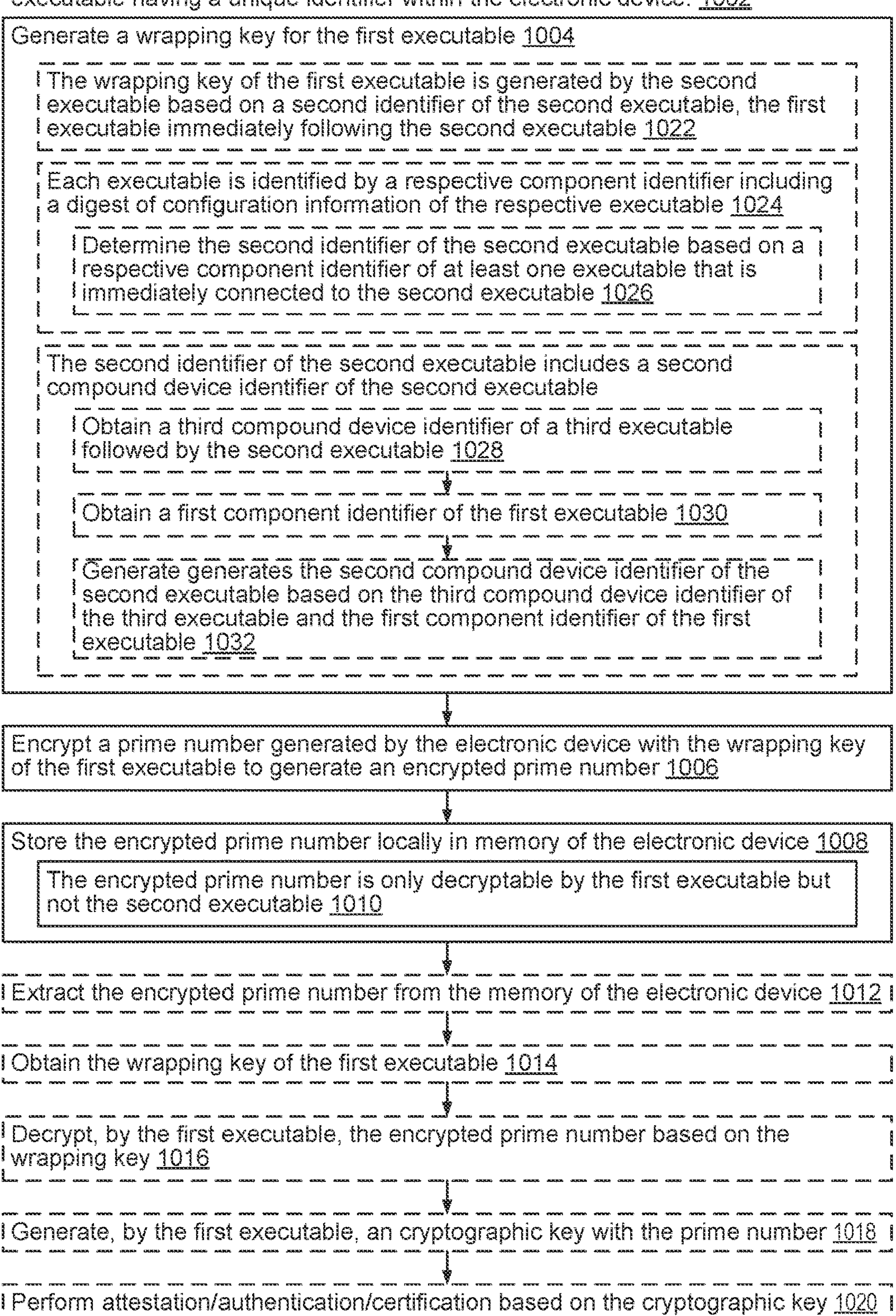
FIG. 10A is a flow diagram of a method for providing a prime number, in accordance with some embodiments.
Figure 10B:
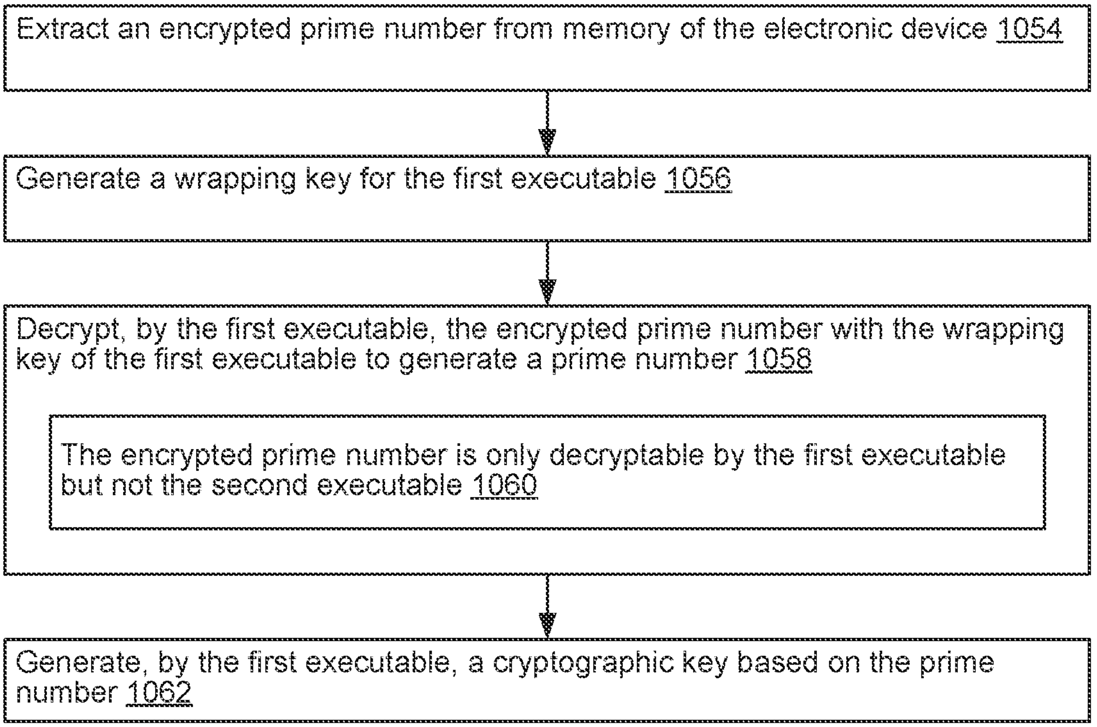
FIG. 10B is a flow diagram of a method that implements a secure operation based on a prime number, in accordance with some embodiments.

FIG. 10A is a flow diagram of a method 1000 for providing a prime number, in accordance with some embodiments, and FIG. 10B is a flow diagram of a method 1050 that implements a secure operation based on a prime number, in accordance with some embodiments. For convenience, the methods 1000 and 1050 are described as being implemented by an electronic device 100 (e.g., an Internet of things (IoT) device, an autonomous vehicle, and a surveillance camera). Methods 1000 and 1050 are optionally, governed by instructions that are stored in a non-transitory computer readable storage medium and that are executed by one or more processors of the computer system. Each of the operations shown in FIGS. 10A and 10B may correspond to instructions stored in a computer memory or non-transitory computer readable storage medium. The computer readable storage medium may include a magnetic or optical disk storage device, solid state storage devices such as flash memory, or other non-volatile memory device or devices. The instructions stored on the computer readable storage medium may include one or more of: source code, assembly language code, object code, or other instruction format that is interpreted by one or more processors. Some operations in method 1000 may be combined and/or the order of some operations may be changed.

Referring to FIGS. 10A, in some embodiments, the electronic device 100 (1002) has a first executable 502A and a second executable 502B. Each executable has a unique identifier 602 (FIG. 6) within the electronic device 100. The electronic device 100 generates (1004) a wrapping key 402A for the first executable 502A and encrypts (1006) a prime number 202A generated by the electronic device 100 with the wrapping key 402A of the first executable 502A to generate an encrypted prime number 404A. The electronic device 100 stores (1008) the encrypted prime number 404A locally in memory 406 of the electronic device 100 (FIG. 4). The encrypted prime number 404A is (1010) only decryptable by the first executable 502A but not by the second executable 502B. In some embodiments, the electronic device 100 determines a memory address associated with the first executable 502A, e.g., based on metadata 408 (FIG. 4) of the first executable 502A. The encrypted prime number 404A is stored in the memory 406 of the electronic device 100 based on the memory address. In some embodiments, the encrypted prime number 404A is stored for the first executable 502A during a boot stage.

In some embodiments, the first executable 502A extracts (1012) the encrypted prime number 404A from the memory of the electronic device 100, obtains (1014) the wrapping key 402A of the first executable 502A, and decrypts (1016), by the first executable 502A, the encrypted prime number 404A based on the wrapping key 402A. Only the first executable 502A can obtain the wrapping key 402A and use it to decrypt the encrypted prime number 404A. In some embodiments, the first executable 502A can obtain the wrapping key 402A from the second executable 502B, which is immediately precedes the first executable 502A, and however, the second executable 502B is prohibited from applying the wrapping key 402A to decrypt the encrypted prime number 404A of the first executable 502A.

In some embodiments, the wrapping key 402A of the first executable 502A is generated by the second executable 502B, and the first executable 502A immediately follows the second executable 502B. The electronic device 100 provides, by the second executable 502B, the wrapping key 402A of the first executable 502A to the first executable 502A, allowing the first executable 502A to encrypt the prime number 202A with the wrapping key 402A of the first executable 502A. Further, in some embodiments, the second executable 502B obtains a random number and generates the wrapping key 402A for the first executable 502A based on both the random number and a second identifier of the second executable 502B.

In some embodiments, referring to FIG. 2, the first executable 502A generates (1018) a cryptographic key 204 with the prime number 202A. The electronic device 100 performs (1020) attestation, authentication, certification, or encryption based on the cryptographic key 204. Further, in some embodiments, the cryptographic key 204-0 includes a signature used for attestation of the electronic device 100 (e.g., the first executable 502A). In some embodiments, the cryptographic key 204-N includes a signature used for attestation of a software application executed by the first executable 502A. Alternatively, in some embodiments, the cryptographic key 204-1 includes an encryption key used to encrypt data or secrets.

In some embodiments, the wrapping key 402A of the first executable 502A is generated (1022) by the second executable 502B based on a second identifier of the second executable 502B, and the first executable 502A immediately follows the second executable 502B. Each executable is identified (1024) by a respective component identifier 504 including a digest of configuration information of the respective executable. In some embodiments, the configuration information includes information of one or more of: firmware, configuration, vendor name, product information, version, Security Version Number (SVN), and an instance identifier of the respective executable. Further, in some embodiments, the electronic device 100 determines (1026) the second identifier of the second executable 502B based on a respective component identifier 504 of at least one executable that is immediately connected to the second executable 502B. Alternatively, in some embodiments, the electronic device 100 determines the second identifier of the second executable 502B based on a second component identifier 504B of the second executable 502B, independently of any other executable distinct from the second executable 502B.

In some embodiments, the second identifier of the second executable 502B includes a second compound device identifier 506B of the second executable 502B. The electronic device 100 obtains (1028) a third compound device identifier 506C of a third executable 502C followed by the second executable 502B, and obtains (1030) a first component identifier 504A of the first executable 502A. The electronic device 100 generates (1032) the second compound device identifier 506B of the second executable 502B based on the third compound device identifier 506C of the third executable 502C and the first component identifier 504A of the first executable 502A.

In some embodiments, the second identifier of the second executable 502B includes a second compound device identifier 506B of the second executable 502B. The electronic device 100 obtains a first component identifier 504A of the first executable 502A and a unique device secret (UDS) 606 of an engine component 208 (e.g., a device identifier composition engine (DICE)). The second executable 502B immediately follows the engine component 208. The electronic device 100 determines the second compound device identifier 506B of the second executable 502B based on the first component identifier 504A of the first executable 502A and the UDS 606 of the engine component 208. In some embodiments, the second executable 502B immediately follows an engine component 208. The electronic device 100 obtains a UDS 606 of the engine component 208 and generates the second identifier of the second executable 502B based on at least the UDS 606 of the engine component 208.

In some embodiments, the electronic device 100 generates the prime number 202A locally in the electronic device 100.

In some embodiments, the memory includes a volatile memory unit (e.g., DRAM and SRAM), and the encrypted prime number 404A is stored in the volatile memory unit of the memory of the electronic device 100. Alternatively, in some embodiments, the memory includes a non-volatile memory unit, and the encrypted prime number 404A is stored in the non-volatile memory unit of the memory of the electronic device 100. Non-volatile memory refers to storage in semiconductor memory chips. Data are stored in floating-gate memory cells including floating-gate metaloxide-semiconductor field-effect transistors (MOSFETs). The non-volatile memory unit includes flash memory storage such as NAND flash and solid-state drives (SSD). Other examples of non-volatile memory include read-only memory (ROM), erasable programmable ROM (EPROM) and electrically erasable programmable ROM (EEPROM), ferroelectric RAM, and other types of data storage devices (e.g., disk storage, hard disk drives, optical discs, floppy disks, and magnetic tape).

In some embodiments, the electronic device 100 has a plurality of programmable components and organizes the plurality of programmable components into a plurality of executables in a tree structure. The plurality of executables include the first and second executable 502B, and each executable has one or more respective components. Each programmable component includes hardware, firmware, software, configuration, or a combination thereof.

Referring to FIG. 10B, in some embodiments, an electronic device 100 has (1052) a first executable 502A and a second executable 502B. Each executable has a unique identifier 602 within the electronic device 100. The electronic device 100 extracts (1054) an encrypted prime number 404A from memory of the electronic device 100, generates (1056) a wrapping key 402A for the first executable 502A, and decrypts (1058), by the first executable 502A, the encrypted prime number 404A with the wrapping key 402A of the first executable 502A to generate a prime number 202. The encrypted prime number 404A is only decryptable (1060) by the first executable 502A but not the second executable 502B. The first executable 502A generates (1062) a cryptographic key 204 based on the prime number 202A.

It should be understood that the particular order in which the operations in FIGS. 10A and 10B have been described are merely exemplary and are not intended to indicate that the described order is the only order in which the operations could be performed. One of ordinary skill in the art would recognize various ways to provide prime numbers applicable in a secure operation (e.g., attestation, authentication, certification, and encryption). Additionally, it should be noted that details of other processes described above with respect to FIGS. 1-9 are also applicable in an analogous manner to methods 1000 and 1050 described above with respect to FIGS. 10A and 10B. For brevity, these details are not repeated here.

Some implementations of this applications are pertinent to a security feature of attestation (e.g., firmware attestation) that is a major push in the storage and other industries. For example, the U.S. government sets forth platform resiliency requirements including some requirements for attestation. Attestation has broad applicability across many market segments, including storage such as SSDs. In another example, the method 1000 is implemented in a surveillance camera to provide a prime number therein.

Memory used to storing instructions and data associated with the methods 1000 and 1050 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores programs, modules, and data structures, or a subset or superset for implementing methods 1000 and 1050.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method, comprising:

at an electronic device having a first executable and a second executable, each executable having a unique identifier within the electronic device:

generating a wrapping key for the first executable;

encrypting a prime number generated by the electronic device with the wrapping key of the first executable to generate an encrypted prime number;

storing the encrypted prime number locally in memory of the electronic device, wherein the encrypted prime number is stored for the first executable during a boot stage, and wherein the encrypted prime number is decryptable by the first executable but not by the second executable, and the encrypted prime number is stored at a memory address known by the first executable but not by the second executable; and implementing a secure operation, including determining that the secure operation requires the prime number and, in response to the determination, extracting the encrypted prime number from the memory of the electronic device without regenerating the prime number.

2. The method of claim 1, implementing the secure operation further comprising, at the first executable:

extracting the encrypted prime number from the memory of the electronic device;

obtaining the wrapping key of the first executable; and decrypting, by the first executable, the encrypted prime number based on the wrapping key.

3. The method of claim 1, further comprising:

determining the memory address is associated with the first executable, wherein the encrypted prime number is stored in the memory of the electronic device based on the memory address.

4. The method of claim 1, wherein the wrapping key of the first executable is generated by the second executable, and the first executable immediately follows the second executable, the method further comprising:

providing, by the second executable, the wrapping key of the first executable to the first executable, allowing the first executable to encrypt the prime number with the wrapping key of the first executable.

5. The method of claim 4, further comprising:

obtaining a random number by the second executable, wherein the wrapping key for the first executable is generated by the second executable based on both the random number and the unique identifier of the second executable.

6. The method of claim 1, further comprising:

generating, by the first executable, a cryptographic key with the prime number; and performing attestation, authentication, certification, or encryption based on the cryptographic key.

7. The method of claim 1, wherein the unique identifier of the second executable includes a second identifier, and the wrapping key of the first executable is generated by the second executable based on the second identifier of the second executable, the first executable immediately following the second executable, and wherein each executable is identified by a respective component identifier including a digest of configuration information of the respective executable.

8. The method of claim 7, further comprising:

determining the second identifier of the second executable based on a respective component identifier of at least one executable that is immediately connected to the second executable.

9. The method of claim 7, further comprising:

determining the second identifier of the second executable based on a second component identifier of the second executable, independently of any other executable distinct from the second executable.

10. The method of claim 7, wherein the second identifier of the second executable includes a second compound device identifier of the second executable, the method further comprising:

obtaining a third compound device identifier of a third executable followed by the second executable;

obtaining a first component identifier of the first executable; and generating the second compound device identifier of the second executable based on the third compound device identifier of the third executable and the first component identifier of the first executable.

11. The method of claim 7, wherein the second identifier of the second executable includes a second compound device identifier of the second executable, the method further comprising:

obtaining a first component identifier of the first executable;

obtaining a unique device secret (UDS) of an engine component, the second executable immediately following the engine component; and determining the second compound device identifier of the second executable based on the first component identifier of the first executable and the UDS of the engine component.

12. The method of claim 7, wherein the second executable immediately follows an engine component, the method further comprising:

obtaining a UDS of the engine component and generating the second identifier of the second executable based on at least the UDS of the engine component.

13. The electronic device of claim 8, the memory further comprising instructions for:

generating the prime number locally in the electronic device.

14. The method of claim 1, wherein the memory includes a volatile memory unit, and the encrypted prime number is stored in the volatile memory unit of the memory of the electronic device.

15. The method of claim 1, wherein the memory includes a non-volatile memory unit, and the encrypted prime number is stored in the non-volatile memory unit of the memory of the electronic device.

16. An electronic device, comprising:

one or more processors, the electronic device having a first executable and a second executable, each executable having a unique identifier within the electronic device; and memory having instructions stored thereon, which when executed by the one or more processors cause the processors to implement operations including:

generating a wrapping key for the first executable;

encrypting a prime number generated by the electronic device with the wrapping key of the first executable to generate an encrypted prime number;

storing the encrypted prime number locally in memory of the electronic device, wherein the encrypted prime number is stored for the first executable during a boot stage, and wherein the encrypted prime number is decryptable by the first executable but not by the second executable, and the encrypted prime number is stored at a memory address known by the first executable but not by the second executable; and implementing a secure operation, including determining that the secure operation requires the prime number and, in response to the determination, extracting the encrypted prime number from the memory of the electronic device without regenerating the prime number.

17. The electronic device of claim 16, wherein the electronic device has a plurality of programmable components, the memory further comprising instructions for:

organizing the plurality of programmable components into a plurality of executables in a tree structure, the plurality of executables including the first and second executables, each executable having one or more respective components.

18. The electronic device of claim 16, the memory further comprising instructions for, at the first executable:

extracting the encrypted prime number from the memory of the electronic device;

obtaining the wrapping key of the first executable; and decrypting, by the first executable, the encrypted prime number based on the wrapping key.

19. A non-transitory computer-readable storage medium, having instructions stored thereon, which when executed by one or more processors cause the processors to implement operations comprising: at an electronic device having a first executable and a second executable, each executable having a unique identifier within the electronic device:

generating a wrapping key for the first executable;

encrypting a prime number generated by the electronic device with the wrapping key of the first executable to generate an encrypted prime number;

storing the encrypted prime number locally in memory of the electronic device, wherein the encrypted prime number is stored for the first executable during a boot stage, and wherein the encrypted prime number is decryptable by the first executable but not by the second executable, and the encrypted prime number is stored at a memory address known by the first executable but not by the second executable; and implementing a secure operation, including determining that the secure operation requires the prime number and, in response to the determination, extracting the encrypted prime number from the memory of the electronic device without regenerating the prime number.

20. The non-transitory computer-readable storage medium of claim 19, further comprising instructions for, at the first executable:

extracting the encrypted prime number from the memory of the electronic device;

obtaining the wrapping key of the first executable; and decrypting, by the first executable, the encrypted prime number based on the wrapping key.

* * * * *